(12) United States Patent
Piazza

(10) Patent No.: US 6,393,579 B1
(45) Date of Patent: May 21, 2002

(54) METHOD AND APPARATUS FOR SAVING POWER AND IMPROVING PERFORMANCE IN A COLLAPSABLE PIPELINE USING GATED CLOCKS

(75) Inventor: Thomas A. Piazza, Granite Bay, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/470,099

(22) Filed: Dec. 21, 1999

(51) Int. Cl.[7] .................................................. G06F 1/04
(52) U.S. Cl. ....................................... 713/600; 713/601
(58) Field of Search ................................ 713/500, 600, 713/601; 712/219

(56) References Cited

U.S. PATENT DOCUMENTS 5,493,646 A * 2/1996 Guttag et al. ............... 395/525
5,553,276 A * 9/1996 Dean ........................... 713/500
5,799,165 A * 8/1998 Favor et al. ................. 712/214

\* cited by examiner

Primary Examiner—Dennis M. Butler
(74) Attorney, Agent, or Firm—Calvin E. Wells

(57) ABSTRACT

An embodiment of an apparatus that saves power and improves performance in a pipeline using gated clocks is disclosed. The apparatus includes a clock signal and a first pipeline stage that includes a first data register, a first data valid register, and a first clock gate circuit. The apparatus also includes a second pipeline stage coupled to receive data from the first pipeline stage. The second pipeline stage includes a second data register, a second data valid register, and a second clock gate circuit. The second data register receives data from the first data register when the second clock gate circuit conducts the clock signal to the second data register. The second clock gate circuit conducts the clock signal if the first data valid register indicates that the first data register contains valid data. The second clock gate circuit does not conduct the clock signal to the second data register if the first data valid register indicates that the first data register contains invalid data.

16 Claims, 3 Drawing Sheets

METHOD AND APPARATUS FOR SAVING POWER AND IMPROVING PERFORMANCE IN A COLLAPSABLE PIPELINE USING GATED CLOCKS

FIELD OF THE INVENTION

The present invention pertains to the field of computer systems. More particularly, this invention pertains to the field of improving performance and saving power in a collapsable pipeline using gated clocks.

BACKGROUND OF THE INVENTION

The realities of achieving more and more performance from today's complex graphics devices includes the high cost of dealing with thermal issues. Higher performance generally is obtained through more transistors in more complex devices as well as greater clock speeds. The greater clock speeds and the larger circuitry serve to increase performance but also contribute to greater power consumption and therefore greater thermal issues. The high cost of dealing with thermal issues is generally incurred through the use of thermally enhanced device packaging, heat sinks, and extra air flow via fans. This increased cost is of course undesirable. Graphics device manufacturers seek techniques to reduce power consumption while increasing performance in graphics devices. If a graphics device consumes less power, less cost will be incurred in dealing with thermal issues.

In a typical graphics device, perhaps about 20% of the device is involved with display refresh. Further, about 20% of the graphics memory bandwidth is involved with display refresh. This means that about 20% of the time, about 80% of the graphics device will be forced into an idle state. Graphics devices typically include a number of pipelines, such as 2D and 3D pipelines. During a display refresh period, these pipelines are stalled because the output of the pipelines are unable to access the graphics memory.

Prior graphics devices have sought to reduce power consumption by gating the clock signals to the various pipeline stages that make up the pipelines during display refresh periods. If a pipeline stage does not receive a clock, it cannot "clock in" or receive new data. Because data paths between pipeline stages may be typically as many as 128 bits wide or more, a significant power reduction can be obtained by gating the clocks to the pipeline stages during display refresh periods.

When a typical graphics device pipeline is stalled due to display refresh, one or more pipeline stages may contain invalid data, thereby creating "bubbles" in the pipeline. Prior graphics devices have sought to increase performance by collapsing or eliminating these bubbles during display refresh periods. The technique used involves circuitry that allows each pipeline stage to know whether any of the pipeline stages further downstream contains invalid data. If any downstream stage contains invalid data, the current pipeline stage can know to clock in data from its upstream neighbor because its downstream neighbor is sure to clock in the data presently stored in the current pipeline stage. This technique can therefore collapse a single pipeline bubble in a single clock period.

However, the prior technique for collapsing bubbles in a pipeline becomes impracticable or impossible as pipeline depths increase. Because the circuitry involved must allow each pipeline stage to know the data valid status of each downstream stage, the amount of circuitry involved increases geometrically as pipeline depths increase. Further, the prior technique fails to make efficient use of the display refresh periods by trying to collapse the pipeline bubbles in a single clock period.

BRIEF DESCRIPTION OF THE DRAWINGS

The invention is illustrated by way of example and not limitation in the figures of the accompanying drawings, in which like references indicate similar elements, and in which.

DETAILED DESCRIPTION

Figure 1:
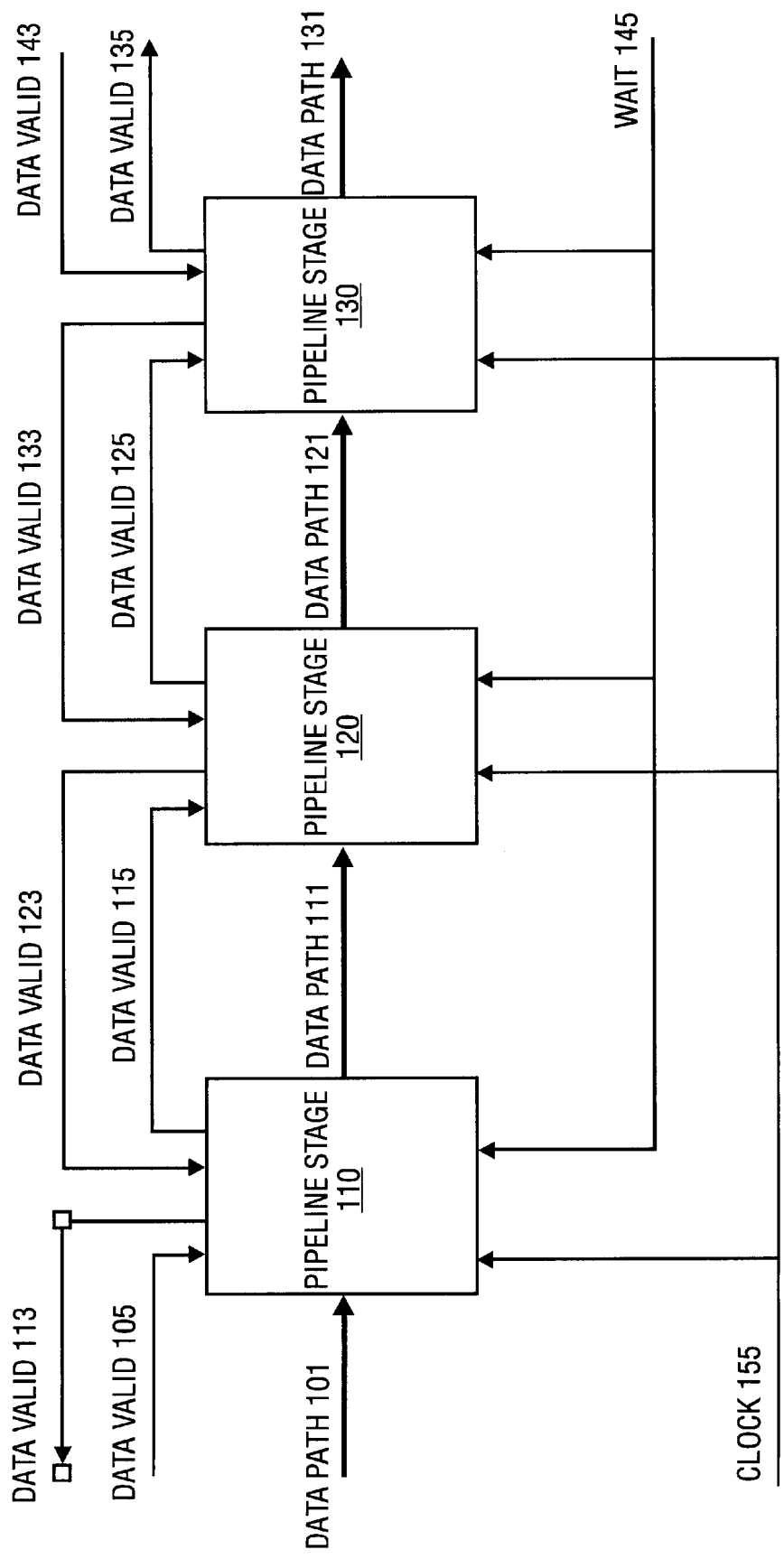
FIG. 1 is a block diagram of several pipeline stages each configured in accordance with an embodiment of the invention.

An embodiment of a method and apparatus for reducing power consumption while increasing performance includes determining which stages in a pipeline require active clock signals. The determination is made on a stage-by-stage basis. Any pipeline stage that does not require an active clock signal is automatically shut down by gating the clock signal to that pipeline stage. A pipeline stage does not require an active clock signal if the stage's data register is not going to receive valid data. The pipeline stage also does not require an active clock signal if the data register is unable or unavailable to receive new data.

In addition to a data register, each pipeline stage includes a data valid register. For the case of determining whether the data register is not going to receive valid data, the current pipeline stage can check the data valid register of the previous pipeline stage. If the previous pipeline stage contains invalid data, there is no need for the current pipeline stage to receive new data, and the clock signal to the current stage can be gated, thereby saving the power that would have been consumed in receiving the new data. Because the data path between any two pipeline stage may be up to 128 bits wide or more, the power savings can be significant.

In situations where a pipeline in a graphics device is stalled due to display refresh or other cases where the pipeline output is unable to access graphics memory, it is desirable to collapse any bubbles that may exist in the pipeline. Under a stall condition, the pipeline's output stage asserts a "wait" signal to the previous stages in the pipeline in order to alert the previous stages of the stall condition. Because display refresh periods have a determinable duration, perhaps about 20 clock periods, there is no need to collapse the bubbles in a single clock period. In one embodiment, bubbles are collapsed by propagating them back through the pipeline one stage at a time. More that one bubble may move at a time.

Normally, while the wait signal is asserted to the various pipeline stages, the clock signals to the various pipeline stages are gated. That is, the clock signals are not conducted to the pipeline stage data registers in order to prevent the data registers from receiving new data. In order to collapse bubbles, however, it is desirable under certain conditions to allow a clock signal to be conducted to a data register. One such condition exists when a first pipeline stage contains valid data and a second pipeline stage immediately following the first pipeline stage in the pipeline contains invalid data. By allowing the second pipeline stage data register to receive the clock signal, the valid data contained in the first pipeline stage will be moved along to the second stage, thereby backing the bubble up the pipeline by one stage. Another condition where it is desirable to allow the clock signal to reach pipeline stage data registers is where there is valid data in a first and a second pipeline stage but a third pipeline stage contains invalid data. In this case, the clock signal is conducted to the second and third stages. This allows the second stage to receive the valid data currently contained in the first stage and also allows the third register to receive the valid data currently contained in the second stage.

By making clock gating determinations on a stage-by-stage basis using data valid information from adjacent pipeline stages, clocks can be selectively enabled in order to collapse bubbles, thereby improving performance, and power savings is achieved by the automatic shut-down of inactive pipeline stages.

Although the previous and following discussions involve pipelines and pipeline stages within graphics devices, other embodiments are possible involving any device where pipelines are used and also where the output of the pipelines may experience wait or stall conditions. One such embodiment may include a system logic device that serves to couple two busses in a computer system where the system logic device includes a pipeline that may experience stall conditions due to latencies associated with gaining ownership of one of the busses.

FIG. 1 is a block diagram of several pipeline stages 110, 120, and 130, each configured in accordance with an embodiment of the invention. The pipeline stages 110, 120, and 130 may be part of a larger pipeline with a depth of perhaps 20 stages. Data is transferred from stage to stage via a data path, represented by data path segments 101, 111, 121, and 131. Each of the pipeline stages 110, 120, and 130 receives a data valid signal from each adjacent stage. Each of the pipeline stages delivers data valid signals to each adjacent stage.

Pipeline stage 110 receives a data valid signal 105 from a previous stage (not shown) and also receives a data valid signal 123 from pipeline stage 120. Pipeline stage 110 delivers a data valid signal 113 to the previous stage and also delivers a data valid signal 115 to pipeline stage 120.

Pipeline stage 120 receives the data valid signal 115 from pipeline stage 110 and also receives a data valid signal 133 from pipeline stage 130. Pipeline stage 120 delivers the data valid signal 123 to pipeline stage 110 and also delivers a data valid signal 125 to pipeline stage 130.

Pipeline stage 130 receives the data valid signal 125 and also receives a data valid signal 143 from a subsequent pipeline stage (not shown). Pipeline stage 130 delivers the data valid signal 133 to pipeline stage 120 and also delivers a data valid signal 135 to the subsequent stage.

Pipeline stages 110, 120, and 130 receive a wait signal 145 from an output stage of the pipeline (not shown). The wait signal 145 indicates that the output of the pipeline is stalled. Pipeline stages 110, 120, and 130 also receive a clock signal 155. In situations where the wait signal 145 is not asserted, the clock signal 155 is generally delivered to a data register (not shown, but discussed in connection with FIG. 2) included in pipeline stages 110, 120, and 130. However, when a data valid signal from a previous pipeline stage is received at a current pipeline stage and the data valid signal from the previous stage indicates that the previous stage contains invalid data, the clock signal 155 will be gated and not delivered to the data register included in the current pipeline stage. For example, if the wait signal 145 is not asserted and data valid signal 115 indicates that the pipeline stage 110 contains invalid data, the clock signal 155 will be gated at pipeline stage 120 and not delivered to the data register included in pipeline stage 120. The circuitry for gating the clock signal 155 is discussed below in connection with FIG. 2.

For situations where the wait signal 145 is asserted, the clock signal 155 is generally gated and not delivered to the data registers included in the pipeline stages 110, 120, and 130. However, the clock signal 155 is not gated in certain situations. For example, where pipeline stage 110 contains valid data as indicated by the data valid signal 115 and pipeline stage 120 contains invalid data, the wait signal 145 is ignored by the pipeline stage 120 and the data register included in stage 120 is allowed to clock in the output of pipeline stage 110. For another example, pipeline stage 110 has valid data, pipeline stage 120 has valid data, and stage 130 has invalid data. In this situation, pipeline stage 130 will ignore the wait signal 145 because the data valid signal 125 received from pipeline stage 120 indicates that stage 120 contains valid data. Because stage 130 contains invalid data, stage 130 can safely clock in the valid output of pipeline stage 120. Also in this situation, pipeline stage 120 will clock in the output of 110. Pipeline stage 120 knows to do this because pipeline stage 120 has received the data valid signal 133 from the pipeline stage 130 indicating that stage 130 contains invalid data. Stage 120 knows, therefore, that stage 130 is sure to clock in the output of stage 120 and stage 120 is free to clock the output of stage 110 which is indicated to be valid by the data valid signal 115.

Figure 2:
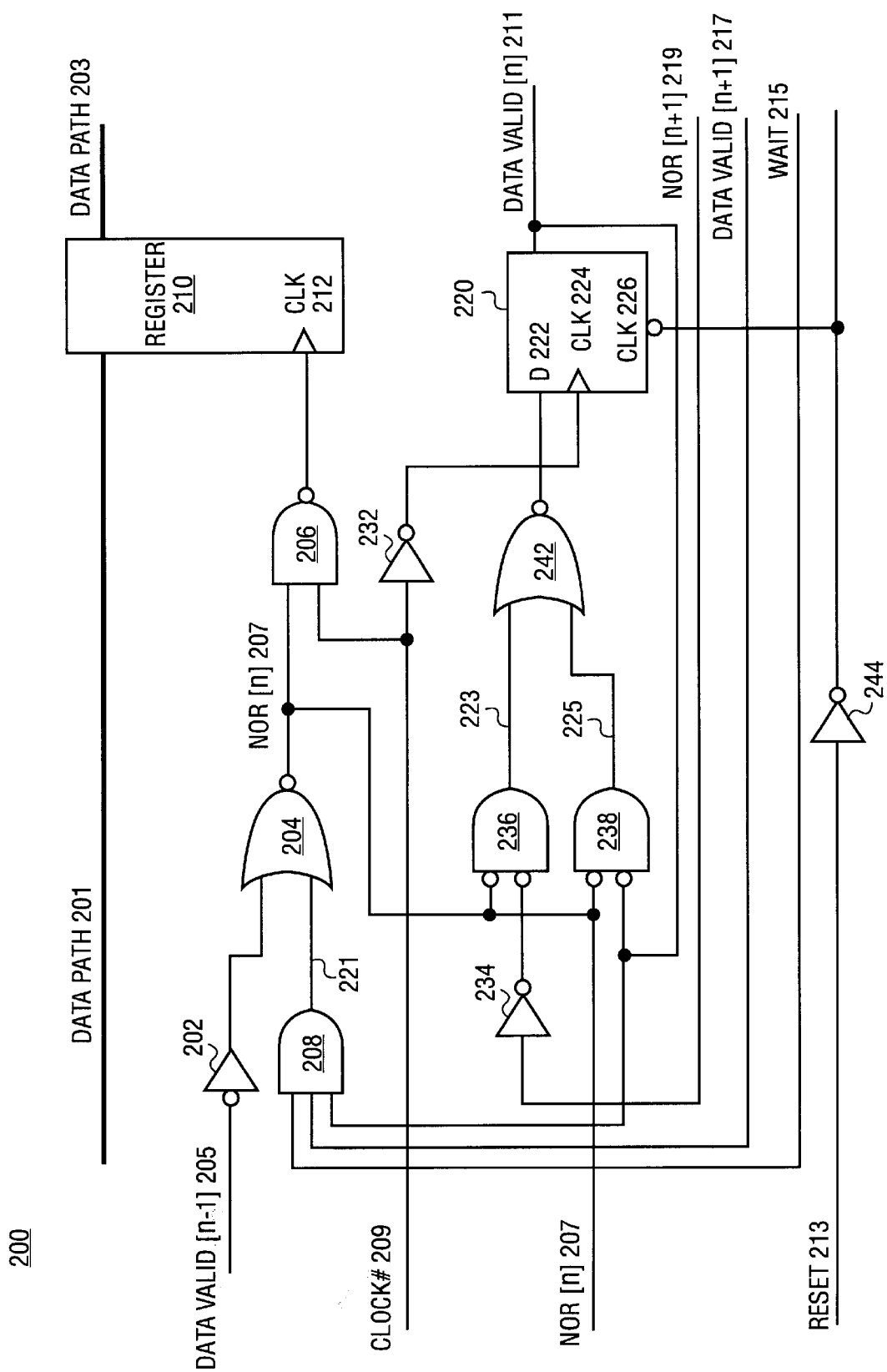
FIG. 2 is a schematic diagram of one pipeline stage configured in accordance with an embodiment of the invention.

FIG. 2 is a schematic diagram of one embodiment of a pipeline stage[n] 200. The pipeline stage[n] 200 is representative of the pipeline stages 110, 120, and 130 as discussed above in connection with FIG. 1. Pipeline stage[n] 200 is meant to represent the $n^{th}$ stage in a pipeline containing at least n+1 stages, where n is greater than 1. Pipeline stage[n] is coupled to receive output from stage[n−1] (not shown) via a data path 201. Data received over the data path 201 is stored in a register 210. New data is clocked into register 210 upon a transition of a signal on the CLK input 212 of register 210. Register 210 outputs data to a stage[n+1] (not shown) via a data path 203.

Stage[n] is further coupled to stage[n−1] via a data valid [n−1] signal 205. This signal 205 indicates the data valid status of data stored at stage[n−1]. Stage[n] is further coupled to stage[n+1] via a data valid [n+1] signal 217 generated at stage[n+1]. Data valid [n+1] 217 indicates the data valid status of data stored at stage[n+1]. Stage[n] also receives a signal NOR [n+1] 219 from stage[n+1]. The signal 219 is analogous to a signal NOR [n] 207 discussed below. The signal NOR [n] 207 is delivered to stage[n], and a data valid [n] signal 211 is delivered to both stage[n−1] and stage [n+1]. The data valid [n] signal 211 indicates the valid data status of data stored in register 210.

The data valid status of stage[n] is maintained by a single bit register 220. A reset signal 213 when delivered to a CLR input 226 of register 220 via an inverter 244 forces the data valid [n] signal 211 to a logical "0" (meaning "invalid").

Stage[n] also receives a wait signal 215 and a clock# signal 209 (the "#" indicates that signal 209 is 180 degrees out of phase—the phase is corrected when the clock# signal 209 passes through an inverter 232 or a NAND gate 206). The wait signal 215 is generated by the output stage of the pipeline (not shown). The wait signal 215 indicates that the pipeline is stalled due to graphics memory being unavailable due to a display refresh operation.

The clock gating circuitry includes the NAND gate 206. Whether or not the clock# signal 209 is gated depends on the status of the node NOR [n] 207. When NOR [n] 207 is at a logically low level ("0"), the output of the NAND gate 206 always remains at a logically high level ("1") and no clock signal is delivered to the CLK input 212 of the register 210. When NOR [n] 207 is at "1", the output of the NAND gate 206 is allowed to reflect the inverse of the clock# signal 209, thereby producing a clock signal at the CLK input 212 of register 210.

When the data valid [n−1] signal is at a logical "0", indicating that stage[n−1] contains invalid data, the output of inverter 202 will be at "1" and the NOR gate 204 will output a "0" onto node NOR [n] 207. As discussed above, a "0" on node NOR [n] 207 will gate the clock# signal 209 and register 210 will not clock in new data. Therefore, whenever stage[n−1] contains invalid data, register 210 will not receive a clock signal and will therefore not receive new data.

In cases where the data valid [n−1] signal is at "1", indicating that stage[n−1] contains valid data, whether or not the clock# signal 209 will be gated by the NAND gate 206 will depend on the output 221 of an AND gate 208. The AND gate 208 receives at its inputs the wait signal 215, the data valid [n+1] signal 217, and the data valid [n] signal 211. In order to allow the clock# signal 209 to reach the register 210 through the NAND gate 206, the output 221 of the AND gate 208 must be at a logical "0". This condition is satisfied whenever any of the wait 215, data valid [n+1] 217, or data valid [n] 211 signals is at a logical "0" level. For example, if the wait signal 215 is not asserted ("0"), the output 221 of the AND gate 208 will be at a logical "0", the node NOR [n] 207 will be at "1", and the clock# signal 209 is allowed to be conducted via NAND gate 206 to the CLK input 212 of register 210. The output 221 of the AND gate 208 will also be at a logical "0" and the clock# signal 209 will reach the register 210 when either the data valid [n] 211 or the data valid [n+1] 217 signals are at "0" indicating that the respective stages contain invalid data. This means that when the wait signal 215 is asserted and when stage[n−1] contains valid data as indicated by the data valid [n−1] signal 205, register 210 will be allowed to clock in new data whenever either stage 200 (stage[n]) or stage[n+1] contains invalid data. However, if both the data valid [n+1] signal 217 and the data valid [n] signal 211 are at "1" indicating valid data and if the wait signal 215 is asserted, the output 221 of the AND gate 208 will be at "1", the node NOR [n] 207 will be at "0", the NAND gate 206 will gate the clock# signal 209, register 210 will not receive a clock input at CLK 212, and register 210 will not clock in new data.

The status of the data valid [n] signal 211 as output by the register 220 is controlled by the logic circuitry including a NOR gate 242, and gates 236 and 238. Whenever either node 223 or node 225 are at a logical "1", a logical "0" will be delivered to the D input 222 of register 220. The logical "0" will be reflected on the data valid [n] signal 211 at the next transition of the CLK 224 input of the register 220. If both of the nodes 223 and 225 are at logical "0", the input 222 of register 220 will receive a logical "1" and the logical "1" will be reflected on the data valid [n] signal at the next transition of the CLK input 224 of the register 220.

In order to satisfy the condition of having both nodes 223 and 225 at "0" so that the data valid [n] signal will indicate that register 210 contains valid data, a logical "1" must be received at at least one of the inputs of both gate 236 and 238. For example, where node NOR [n] 207 is at "0" indicating that register 210 will not gate new data, where NOR [n+1] 219 indicates that stage[n+1] will not clock in the output from register 210, and data valid [n] 211 indicates that register 210 contains valid data, each of nodes 223 and 225 will be at logical "0" and a "1" will be delivered to the input 222 of register 220, thereby maintaining the data valid status of "1" at the data valid [n] signal 211 after the next transition of the clock# signal 209 received at the CLK input 224 of the register 220. This example indicates that where stage[n] contains valid data and where stage[n+1] will not clock in the output of stage[n], the data valid status of stage[n] continues to indicate that valid data is stored in stage[n]. For another example, whenever node NOR [n] 207 is at "1", indicating that register 210 will clock in new data, nodes 223 and 225 will be at "0" and the data valid [n] signal 211 will be at a logical "1" following the next transition of the clock# signal 209 indicating that register 210 contains valid data. This example illustrates that whenever stage[n] clocks in new data, the data valid status of stage[n] indicates that valid data is stored in stage[n].

Whenever either or both of nodes 223 and 225 go to a logical "1", a logical "0" will be delivered to the input 222 of the register 220 and the data valid [n] signal 211 will go to a logical "0" upon the next transition of the clock# signal 209. This condition is satisfied whenever data valid [n] 211 is at "0" indicating invalid data and node NOR [n] 207 is at "0" indicating that no new data is to be received. The condition is also satisfied whenever the NOR [n+1] 219 is at "1" indicating that stage[n+1] is to clock in the output of register 210 and the node NOR [n] 207 is at "0" indicating that no new data is to be clocked in to register 210. Therefore, as seen in these last two examples, the data valid status of stage[n] will indicate that stage[n] contains invalid data whenever stage[n] already contains invalid data and no new data will be clocked in and also whenever stage[n+1] clocks in the output of stage[n] and stage[n] does not clock in data from stage[n−1].

Figure 3:
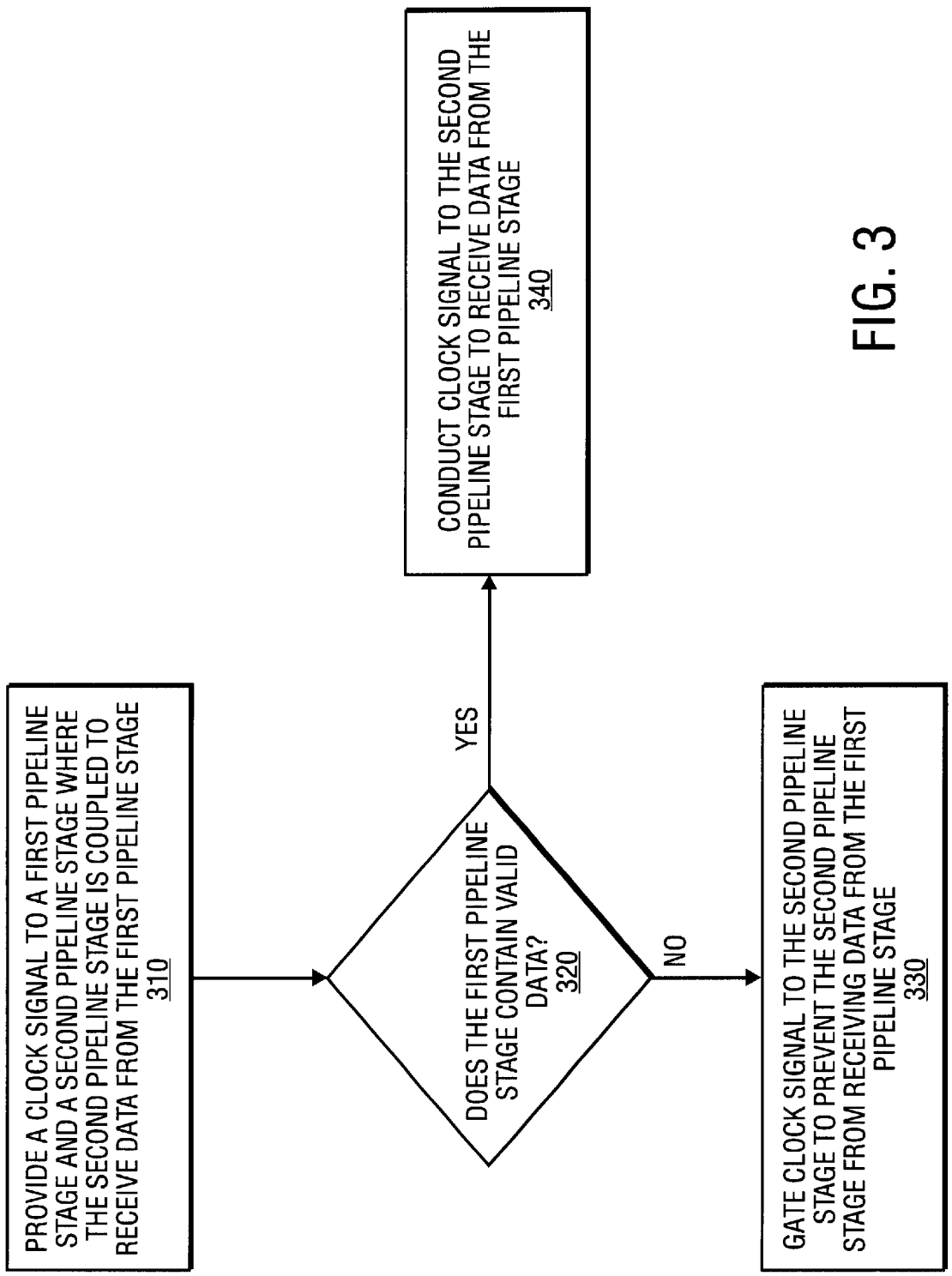
FIG. 3 is a flow diagram of a method for saving power in accordance with an embodiment of the invention.

FIG. 3 is a flow diagram of one embodiment of a method for saving power in a pipeline using gated clocks. At step 310, a clock signal is provided to a first pipeline stage and also to a second pipeline stage where the second pipeline stage is coupled to receive the output of the first pipeline stage. As indicated at step 320, if the first pipeline stage contains valid data, the clock signal is conducted to the second pipeline stage at step 340 to enable the second stage to receive the output of the first stage. Also as indicated at step 320, if the first pipeline stage does not contain valid data, the clock signal to the second pipeline stage is gated at step 330 to prevent the second pipeline stage from receiving the output of the first pipeline stage.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

What is claimed is:

1. An apparatus, comprising:
   a clock signal;
   a first pipeline stage including a first data register, a first data valid register, and a first clock gate circuit; and
   a second pipeline stage coupled to receive data from the first pipeline stage, the second pipeline stage including a second data register, a second data valid register, and a second clock gate circuit, the second data register to receive data from the first data register when the second clock gate circuit conducts the clock signal to the second data register, the second clock gate circuit to conduct the clock signal if the first data valid register indicates that the first data register contains valid data, the second clock gate circuit further to not conduct the clock signal to the second data register if the first data valid register indicates that the first data register contains invalid data.

2. The apparatus of claim 1 further comprising a third pipeline stage coupled to receive data from the second pipeline stage, the third pipeline stage including a third data register, a third data valid register, and a third clock gate circuit.

3. The apparatus of claim 2 further comprising a wait signal, an assertion of the wait signal to indicate to the first, second, and third pipeline stages to not conduct the clock signal to prevent the first, second, and third data registers from receiving data.

4. The apparatus of claim 3 wherein the second clock gate circuit conducts the clock signal to the second data register to cause the second data register to receive data from the first data register despite an assertion of the wait signal if the first data valid register indicates that the first data register contains valid data and if the second data valid register indicates that the second data register contains invalid data.

5. The apparatus of claim 3 wherein the second clock gate circuit conducts the clock signal to the second data register and the third clock gate circuit conducts the clock signal to the third data register if the first and second data valid registers indicate that the first and second data registers contain valid data and the third data valid register indicates that the third data register contains invalid data.

6. An apparatus, comprising:
a clock signal;
a first pipeline stage including first means for storing data, first means for indicating whether the first means for storing data contains valid data, and first means for gating the clock signal; and
a second pipeline stage coupled to receive data from the first pipeline stage, the second pipeline stage including second means for storing data, second means for indicating whether the second means for storing data contains valid data, and second means for gating the clock circuit, the second means for storing data to receive data from the first means for storing data when the second means for gating the clock signal conducts the clock signal to the second means for storing data, the second means for gating the clock signal to conduct the clock signal if the first means for indicating whether the first means for storing data indicates that the first means for storing data contains valid data, the second means for gating the clock signal further to not conduct the clock signal to the second means for storing data if the first means for indicating whether the first means for storing data indicates that the first means for storing data contains invalid data.

7. The apparatus of claim 6 further comprising a third pipeline stage coupled to receive data from the second pipeline stage, the third pipeline stage including third means for storing data, third means for indicating whether the third means for storing data contains valid data, and third means for gating the clock signal.

8. The apparatus of claim 7 further comprising means for indicating to the first, second, and third pipeline stages that a wait condition exists, an indication that a wait condition exists to indicate to the first, second, and third means for gating the clock signal to not conduct the clock signal to prevent the first, second, and third means for storing data from receiving data.

9. The apparatus of claim 8 wherein the second means for gating the clock signal conducts the clock signal to the second means for storing data to cause the second means for storing data to receive data from the first means for storing data when the means for indicating that a wait condition exists indicates that a wait condition exists if the first means for indicating that the first means for storing data contains valid data indicates that the first means for storing data contains valid data and if the second means for indicating that the second means for storing data indicates that the second means for storing data contains invalid data.

10. The apparatus of claim 8 wherein the second means for gating the clock signal conducts the clock signal to the second means for storing data and the third means for gating the clock signal conducts the clock signal to the third means for storing data if the first means for indicating whether the first means for storing data contains valid data and the second means for indicating that the second means for storing data indicate that the first and second means for storing data contain valid data and the third means for indicating that the third means for storing data contains valid data indicates that the third means for storing data contains invalid data.

11. A method, comprising:
providing a clock signal to a first pipeline stage and a second pipeline stage, the second pipeline stage coupled to receive data from the first pipeline stage;
indicating whether the first pipeline stage contains valid data; and
gating the clock signal to the second pipeline stage if the first pipeline stage contains invalid data, the gating of the clock signal to prevent the second pipeline stage from receiving data from the first pipeline stage.

12. The method of claim I 1, further comprising asserting a wait signal to the first pipeline stage and the second pipeline stage, the wait signal to indicate the existence of a wait condition.

13. The method of claim 12, further including indicating whether the second pipeline stage contains valid data.

14. The method of claim 13, further comprising conducting the clock signal to the second pipeline stage to cause the second pipeline stage to receive data from the first pipeline stage while the wait signal is asserted if the first pipeline stage contains valid data and if the second pipeline stage contains invalid data.

15. The method of claim 13, further comprising:
providing the clock signal to a third pipeline stage, the third pipeline stage coupled to receive data from the second pipeline stage; and
asserting the wait signal to the third pipeline stage.

16. The method of claim 15, further comprising conducting the clock signal to the second pipeline stage and to the third pipeline stage while the wait signal is asserted if the first and second pipeline stages contain valid data and if the third pipeline stage contains invalid data.

* * * * *

UNITED STATES PATENT AND TRADEMARK OFFICE
CERTIFICATE OF CORRECTION

| | |
|---|---|
| PATENT NO. | : 6,393,579 B1 |
| DATED | : May 21, 2002 |
| INVENTOR(S) | : Piazza |

It is certified that error appears in the above-identified patent and that said Letters Patent is hereby corrected as shown below:

<u>Column 8,</u>
Line 40, delete "I 1" and insert -- 11 --.

Signed and Sealed this

Twenty-second Day of June, 2004

JON W. DUDAS
*Acting Director of the United States Patent and Trademark Office*